June 15, 1948.　　B. H. RUSSELL　　2,443,271
PIPE REPAIR CLAMP
Filed Feb. 3, 1947　　2 Sheets-Sheet 1
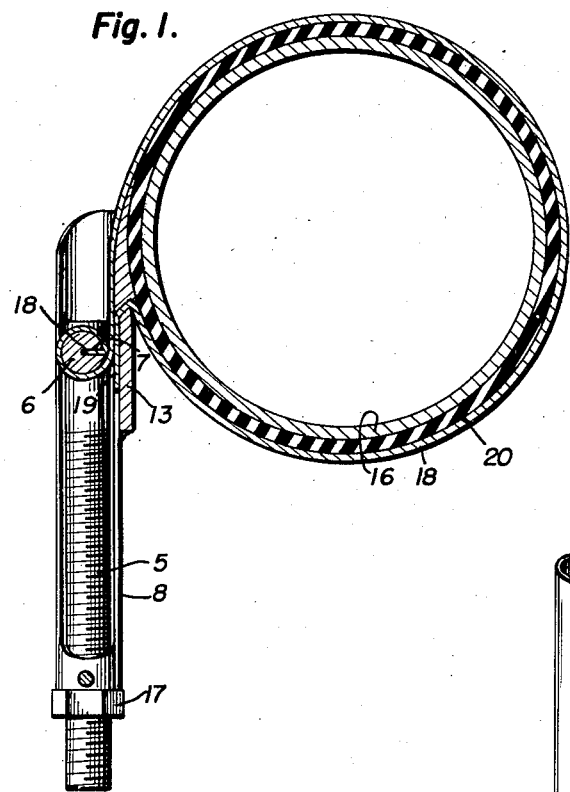
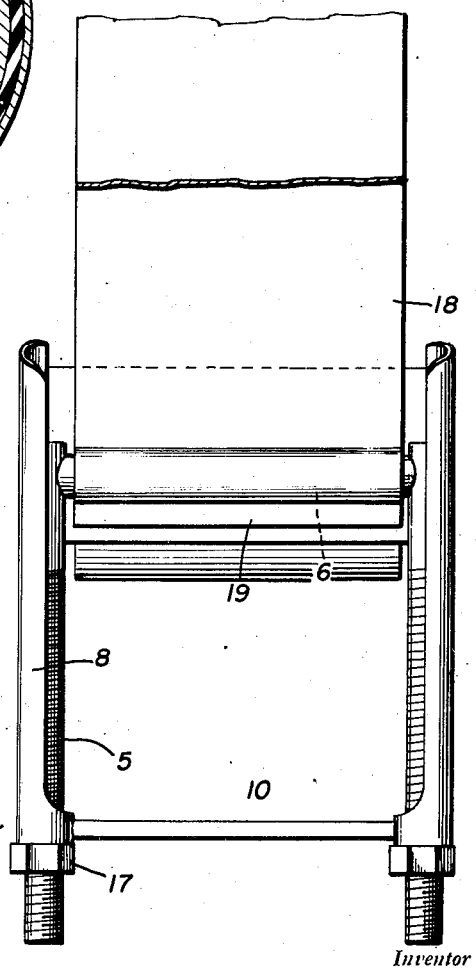
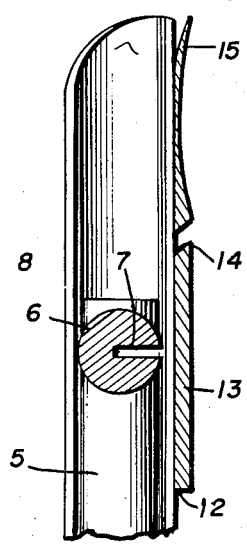
Inventor
Ben H. Russell June 15, 1948.   B. H. RUSSELL   2,443,271
PIPE REPAIR CLAMP
Filed Feb. 3, 1947   2 Sheets-Sheet 2
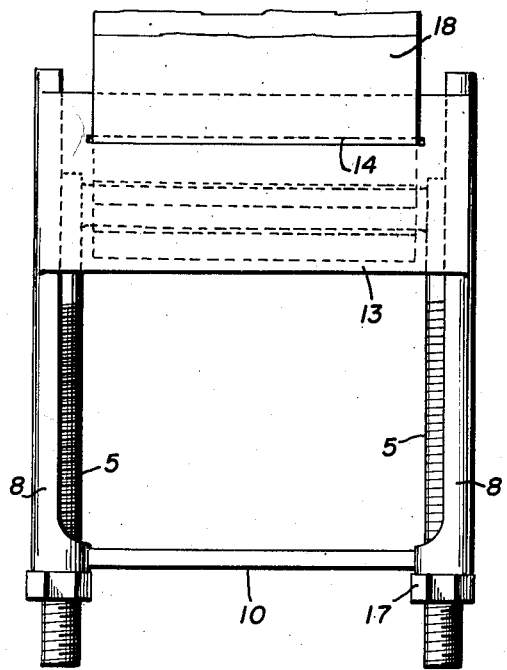
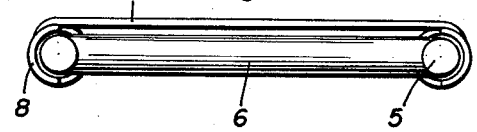
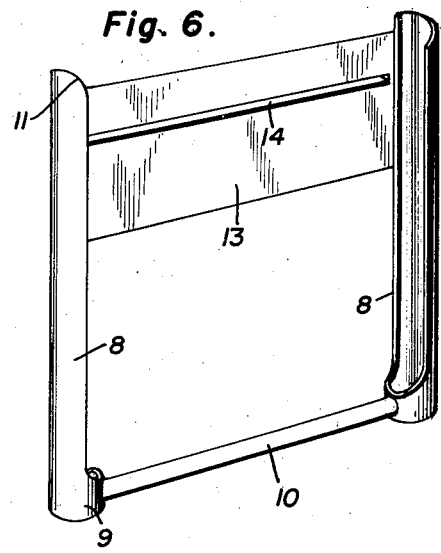
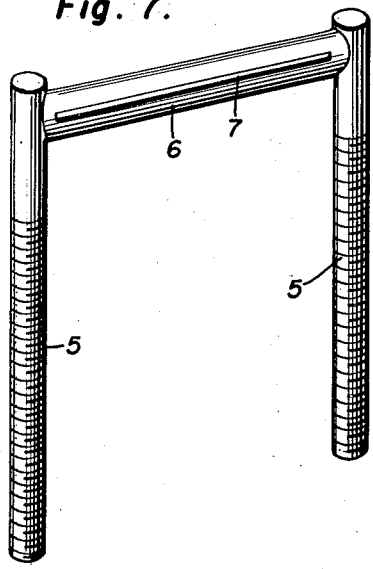
Inventor
Ben H. Russell
By *Clarence A. O'Brien and Harvey B. Jacobson*
Attorneys Patented June 15, 1948

2,443,271

UNITED STATES PATENT OFFICE 2,443,271

PIPE REPAIR CLAMP

Ben H. Russell, Cle Elum, Wash.

Application February 3, 1947, Serial No. 726,026

4 Claims. (Cl. 138—99)

The present invention relates to new and useful improvements in pipe repair clamps.

The primary feature of the present invention is to provide a device that is particularly adapted for repairing a section of pipe partially or completely broken in two or for coupling sections of a pipe together.

Another important feature of this invention is to provide a coupling device that is simple in operation thereby necessitating a minimum amount of time in repairing a broken pipe line.

A further feature of the invention is to provide a device of the character referred to consisting of two detachable parts which when removed from each other make a small and neat article which is conveniently packed for shipment or storage.

A still further feature of this invention is to provide a device adapted for repairing broken pipe lines which is simple and practical in construction, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view through the cross arm of the device showing the clamp applied to a section of pipe;

Figure 2 is a front elevational view of the pipe clamp removed from a pipe;

Figure 3 is an enlarged fragmentary sectional view showing the clamping end of the pipe coupling;

Figure 4 is a rear elevational view;

Figure 5 is a top plan view of the device removed from a pipe section;

Figure 6 is a perspective view of the adjustable frame forming one part of the clamp; and Figure 7 is a perspective view of the U-shaped threaded frame forming the other part of the clamp.

Referring now to the drawings in detail, wherein for the purpose of illustration, I have disclosed a preferred embodiment of the present invention, the numeral 5 represents a pair of parallel externally threaded standards connected at their upper end by an integrally formed cross arm 6 having a longitudinally extending groove 7 therein.

A pair of parallel semi-cylindrical sleeves 8 having their open sides opposing each other are slidable on standards 5, and the lower ends 9 of said sleeves are completely cylindrical and connected by a cross bar 10, while the upper edges of said sleeves are preferably rounded off as at 11.

Secured as at 12 to one of the upper side edges of said sleeves 8 are the side edges of a substantially rectangular plate 13 having a downwardly inclined longitudinally extending slot 14, the upper portion 15 of said plate is curved outwardly to conform to the curvature of a circular pipe 16 and has a feathered edge. Nuts 17 adjustable on standards 5 cause a longitudinal adjustment of sleeves 8 relative to said standards.

In operation of the device the frame provided with the bar 6 is moved outwardly beyond the end of the sleeves 8 and one end of one or more flexible metal bands 18 are rolled on the bar 6 and inserted in the slot 7. The bands 18 then encircle the pipe section 16 and the opposite ends 19 of said band extend inwardly in slot 14 and rests vertically against the lower inner face of plate 13 as shown in Figure 1.

The standards 5 are then moved inwardly of sleeves 8 by tightening nuts 17 which causes metal bands 18 to likewise tighten around the rubber ring 20 previously encircling the broken pipe section 16 thereby providing a hasty expedient for preventing leakage of a broken pipe section or for coupling a pair of pipe sections together.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A pipe repairing device comprising a flexible band adapted to encircle a pipe, a packing ring positioned between the band and a pipe, said band having end portions, and a clamp for the ends of the band and including a pair of tubular members, means connecting said members in spaced parallel relation to each other, said members having longitudinal slots in their opposed edges, means carried by said members for anchoring one end of the band thereto, a U-shaped frame slidably mounted in said tubular members and connected to the other end of said band, and means securing the frame and tubular members in slidably adjusted position relative to each other to contract the band and ring about the pipe.

2. A pipe repairing device comprising a flexible band adapted to encircle a pipe, a packing ring positioned between the band and the pipe, said band having end portions, and a clamp for the ends of the band and including a pair of tubular members, means connecting said members in spaced parallel relation to each other, said members having longitudinal slots in their opposed edges, a substantially rectangular plate connecting the upper ends of said tubular members, said plate having a slot therein adapted to engage one end of the band, a U-shaped frame slidably mounted in said tubular member and connected to the other end of said band, and means securing the frame and tubular members in slidably adjusted position relative to each other to contract the band and ring about the pipe.

3. A pipe repairing device comprising a flexible band adapted to encircle a pipe, a packing ring positioned between the band and the pipe, said band having end portions, and a clamp for the ends of the band and including a pair of tubular members, means connecting said members in spaced parallel relation to each other, said members having longitudinal slots in their opposed edges, a substantially rectangular plate connecting the upper ends of said tubular members, said plate having a slot therein adapted to engage one end of the band, a U-shaped frame including a pair of screws, a cross arm connecting the upper ends of said screws, said screws adjustably mounted in said tubular members, nuts carried by the opposite ends of said screws adjusting the screws in the tubular members and anchoring means carried by said frame adapted to receive the opposite end of the band, said band and ring being contracted about the pipe upon adjustment of said screws in said tubular member.

4. A pipe repairing device comprising a flexible band adapted to encircle a pipe, a packing ring positioned between the band and the pipe, said band having end portions, and a clamp for the ends of the band and including a pair of tubular members, means connecting said members in spaced parallel relation to each other, said members having longitudinal slots in their opposed edges, a substantially rectangular plate connecting the upper ends of said tubular members, said plate having a slot therein adapted to engage one end of the band, a U-shaped frame including a pair of screws, a cross arm connecting the upper ends of said screws, a slot provided in said cross arm adapted to receive the opposite end of said band and nuts carried by the opposite ends of said screws adapted to adjust said screws mounted in said tubular members for contraction of said band and ring about the pipe.

BEN H. RUSSELL.

REFERENCES CITED

The following references are of record in the file of this patent:

UNITED STATES PATENTS

| Number | Name | Date |
|---|---|---|
| 2,127,456 | Adams | Aug. 16, 1938 |
| 2,278,714 | Stauffer | Apr. 7, 1942 |